(12) United States Patent
Alharith et al.

(10) Patent No.: US 12,459,811 B2
(45) Date of Patent: Nov. 4, 2025

(54) PROCESS AND SYSTEM FOR GENERATING A HYDROGEN PRODUCT FROM HYDROGEN SULFIDE WITH MICROWAVE ENERGY

(71) Applicant: Saudi Arabian Oil Company, Dhahran (SA)

(72) Inventors: Abdullah M. Alharith, Khobar (SA); Bader Alharbi, Dammam (SA); Mohammed Alabdrabalnabi, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 719 days.

(21) Appl. No.: 17/746,016

(22) Filed: May 17, 2022

(65) Prior Publication Data

US 2023/0373783 A1    Nov. 23, 2023

(51) Int. Cl.
*C01B 3/04* (2006.01)
*B01J 21/06* (2006.01)
(Continued)

(52) U.S. Cl.
CPC .............. *C01B 3/04* (2013.01); *B01J 21/063* (2013.01); *B01J 23/06* (2013.01); *B01J 27/0515* (2013.01);
(Continued)

(58) Field of Classification Search
None
See application file for complete search history.

(56) References Cited

U.S. PATENT DOCUMENTS 7,455,826 B2    11/2008    Inubushi et al.
7,455,828 B2    11/2008    Selinger et al.
(Continued)

FOREIGN PATENT DOCUMENTS

WO    WO-2015029377 A1 *    3/2015    ............ B01J 23/755

OTHER PUBLICATIONS

WO-2015029377-A1, English translation (Year: 2015).*
(Continued)

*Primary Examiner* — Stefanie J Cohen
(74) *Attorney, Agent, or Firm* — DINSMORE & SHOHL LLP

(57) ABSTRACT

A process and associated system for generating a hydrogen product from a feed gas stream comprising hydrogen sulfide. The process includes thermally decomposing hydrogen sulfide present in the feed gas stream into hydrogen gas and elemental sulfur in a thermal decomposition unit. The thermal decomposition unit includes a reactor vessel with a porous susceptor disposed and retained therein and a microwave generation unit positioned and configured to deliver microwave energy to the porous susceptor. Thermally decomposing hydrogen sulfide in the thermal decomposition unit includes directing microwave energy into the porous susceptor to raise the temperature of the porous, susceptor to greater than 1,000° C. and then passing the hydrogen sulfide through the porous susceptor to thermally decompose the hydrogen sulfide and generate a thermal decomposition unit effluent. The process further includes separating the thermal decomposition unit effluent into a sulfur fraction, a hydrogen rich fraction, and a hydrogen sulfide fraction.

20 Claims, 5 Drawing Sheets

(51) Int. Cl.
  *B01J 23/06* (2006.01)
  *B01J 27/051* (2006.01)
  *C01B 3/50* (2006.01)

(52) U.S. Cl.
  CPC ........ *C01B 3/50* (2013.01); *C01B 2203/0277* (2013.01); *C01B 2203/1205* (2013.01)

(56) References Cited

U.S. PATENT DOCUMENTS

| | | | |
|---|---|---|---|
| 7,960,303 B2 | 6/2011 | Cha | |
| 8,168,126 B2 | 5/2012 | Cha | |
| 8,431,083 B2 | 4/2013 | Cha | |
| 2004/0158112 A1* | 8/2004 | Ramani | B01J 27/224 502/178 |
| 2009/0020902 A1* | 1/2009 | Tabuchi | B01D 39/2075 264/122 |
| 2009/0093358 A1* | 4/2009 | Quadir | C04B 35/62655 501/88 |
| 2014/0130935 A1* | 5/2014 | Lugtigheid | B67D 7/04 422/162 |
| 2015/0298972 A1* | 10/2015 | Ballaguet | C07C 7/12 423/575 |
| 2018/0297004 A1 | 10/2018 | Jaffrey | |
| 2019/0209998 A1 | 7/2019 | Jaffrey | |
| 2020/0139338 A1* | 5/2020 | Jaffrey | C01B 17/0495 |

OTHER PUBLICATIONS

Allan et al., "Microwave Heating Technologies", Heat Treating Progress, pp. 39-42, May/Jun. 2008.

Bandermann et al., "Production of H2 Via Thermal Decomposition of H2S and Separation of H2 and H2S by Pressure Swing Adsorption", Int. J. Hydrogen Energy, vol. 7, No. 6, pp. 471-475, 1982.

Decrisci et al., "Hyrogen from hydrogen sulfide: towards a more sustainable hydrogen economy", International Journal of Hydrogen Energy, pp. 1-29, 2018.

Startsev, "The Reaction Mechanisms of H2S Decomposition into Hydrogen and Sulfur: Application of Classical and Biological Thermodynamics", J. Thermodyn Catal, vol. 8, Issue 2, ISSN: 2160-7544, 2017.

Saudi Arabian Examination Report dated May 17, 2024 pertaining to Saudi Arabian Patent Application No. 123447088, pp. 1-16.

* cited by examiner

PROCESS AND SYSTEM FOR GENERATING A HYDROGEN PRODUCT FROM HYDROGEN SULFIDE WITH MICROWAVE ENERGY

TECHNICAL FIELD

The present disclosure relates to process for generating a hydrogen product from a feed gas comprising hydrogen sulfide using microwave energy to heat a porous susceptor.

BACKGROUND

Many hydrocarbon processing and refining operations generate hydrogen sulfide as a waste product. Hydrogen sulfide is a colorless, poisonous, corrosive, and flammable gas. Further, even trace amounts of hydrogen sulfide in ambient atmosphere generates a characteristic foul odor of rotten eggs. As such, the hydrogen sulfide is generally considered a waste product with little value that must be disposed of resulting in both an economic and labor loss.

In smaller plants or refineries, the hydrogen sulfide is often flared to the atmosphere given the flammable nature of the hydrogen sulfide. However, flaring of the hydrogen sulfide converts it to sulfur dioxide which is a major component of acid rain resulting in an undesirable environmental impact.

In larger plants and refineries, the hydrogen sulfide is typically further processed in various sulfur extraction and recovery systems in order to reduce the volume of hydrogen sulfide to be disposed of through generation of other product stream. However, these systems tend to be costly and still typically generate significant quantities of hydrogen sulfide which are required to be flared.

Thermal decomposition of hydrogen sulfide into hydrogen gas and sulfur has been explored as a method of reducing or eliminating waste hydrogen sulfide. However, thermal decomposition of hydrogen sulfide requires generation of temperatures in excess of 1,000° C. to begin achieving any meaningful decomposition yield. Reaching and sustaining such temperatures is challenging and economically undesirable with conventional techniques.

SUMMARY

Accordingly, there is a clear and long-standing need to provide an efficient and economical process for conversion of waste streams comprising hydrogen sulfide into value added products such as a purified hydrogen product and elemental sulfur.

In accordance with one or more embodiments of the present disclosure, a process for generating a hydrogen product from a feed gas comprising hydrogen sulfide is disclosed. The process includes ((a) thermally decomposing hydrogen sulfide present in the feed gas stream into hydrogen gas and elemental sulfur in a thermal decomposition unit, the thermal decomposition unit comprising a reactor vessel with a porous susceptor disposed and retained therein and a microwave generation unit positioned and configured to deliver microwave energy to the porous susceptor. Thermally decomposing hydrogen sulfide in the thermal decomposition unit includes (i) directing microwave energy from the microwave generation unit into the porous susceptor to raise the temperature of the porous susceptor to greater than 1,000° C., (ii) feeding the hydrogen sulfide present in the feed gas stream into the thermal decomposition unit via a gas inlet, (iii) passing the hydrogen sulfide through the porous susceptor to thermally decompose the hydrogen sulfide and generate a thermal decomposition unit effluent comprising hydrogen gas and elemental sulfur, and (iv) exhausting the thermal decomposition unit effluent from the thermal decomposition unit via a gas outlet. The process further includes (b) separating the thermal decomposition unit effluent into a sulfur fraction, a hydrogen rich fraction, and a hydrogen sulfide fraction, Wherein the hydrogen rich fraction is comprised of at least 90% by volume hydrogen gas, the hydrogen sulfide fraction comprises unreacted hydrogen sulfide in the thermal decomposition unit effluent, and the sulfur fraction comprises sulfur produced from the splitting of the hydrogen sulfide; and (c) obtaining the hydrogen product from the hydrogen rich fraction, wherein the hydrogen product is comprised of at least 95% by volume hydrogen gas.

In accordance with one or more embodiments of the present disclosure, a system for generating a hydrogen product from a feed gas stream comprising hydrogen sulfide is disclosed. The system includes (a) a thermal decomposition unit and (b) a product separation unit. The thermal decomposition unit includes a reactor vessel having a gas inlet and a gas outlet, the reactor vessel having a porous susceptor disposed and retained therein, and a microwave generation unit positioned and configured to deliver microwave energy to the porous susceptor. The gas inlet of the reactor vessel is in fluid communication with the feed gas stream such that the feed gas stream is passed through the porous susceptor and exhausted through the gas outlet as a thermal decomposition unit effluent. The product separation unit is in fluid communication with the gas outlet of the reactor vessel and configured to separate the thermal decomposition unit effluent into a sulfur fraction, a hydrogen rich fraction, and a hydrogen sulfide fraction. The hydrogen rich fraction comprises at least 90% by volume hydrogen gas, the hydrogen sulfide fraction comprises unreacted hydrogen sulfide present in the thermal decomposition unit effluent, and the sulfur fraction comprises sulfur produced from the splitting of the hydrogen sulfide.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

BRIEF DESCRIPTION OF THE DRAWINGS

The following detailed description of specific embodiments of the present disclosure can be best understood when read in conjunction with the following drawings in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1:
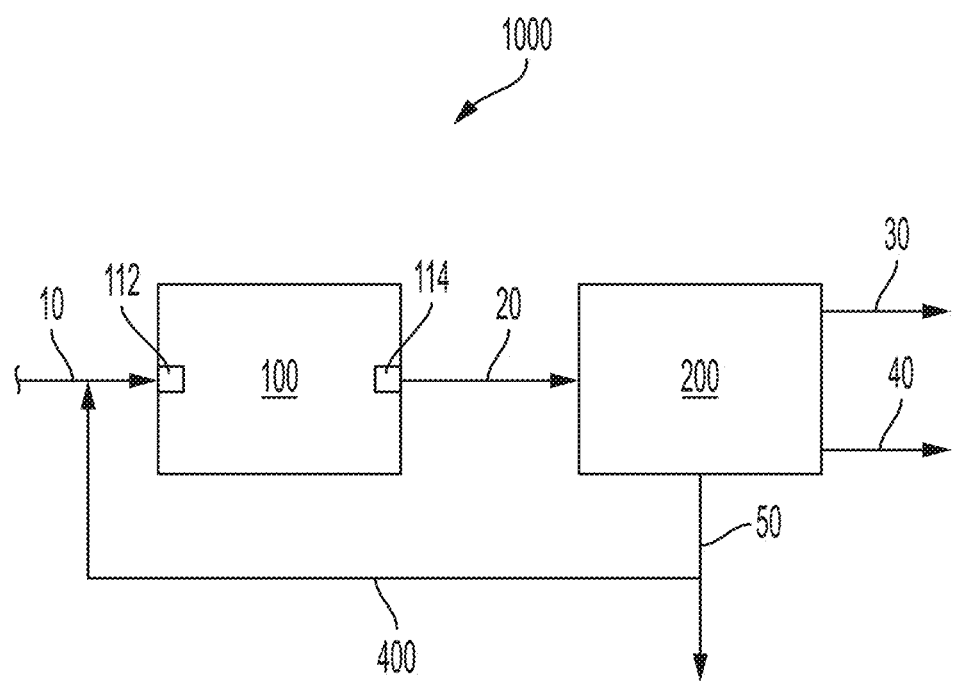
FIG. 1 is a schematic illustration of a system for generating a hydrogen product from a feed gas stream comprising hydrogen sulfide in accordance with one or more embodiments of the present disclosure.

Embodiments of a process and associated system for generating a hydrogen product from a feed gas comprising hydrogen sulfide are provided in the present disclosure. Generally, the hydrogen sulfide is provided to a thermal decomposition unit which utilizes microwave energy to heat a porous susceptor in an expeditious and efficient manner. The hydrogen sulfide is passed through the heated porous susceptor which initiates thermal decomposition of the hydrogen sulfide into hydrogen gas and sulfur. The hydrogen gas may then be separated, purified and collected as the hydrogen product.

A process for generating a hydrogen product from a feed gas comprising hydrogen sulfide includes thermally decomposing hydrogen sulfide present in the feed gas into hydrogen gas and elemental sulfur in a thermal decomposition unit. The thermal decomposition unit comprises a reactor vessel and a microwave generation unit. The reactor vessel has a porous susceptor disposed and retained within an interior volume of the reactor vessel. Further, the microwave generation unit is positioned and configured to deliver microwave energy to the porous susceptor. Thermally decomposing hydrogen sulfide in the thermal decomposition unit comprises directing microwave energy from the microwave generation unit into the porous susceptor to raise the temperature of the porous susceptor to greater than 1,000° C., feeding the hydrogen sulfide present in the feed gas into the thermal decomposition unit via a gas inlet, passing the hydrogen sulfide through the porous susceptor to thermally decompose the hydrogen sulfide and generate a thermal decomposition unit effluent comprising hydrogen gas and elemental sulfur, and exhausting the thermal decomposition unit effluent from the thermal decomposition unit via a gas outlet. The process for generating a hydrogen product from a feed gas comprising hydrogen sulfide further includes separating the thermal decomposition unit effluent into a sulfur fraction, a hydrogen rich fraction, and a hydrogen sulfide fraction, wherein the hydrogen rich fraction is comprised of at least 90% by volume hydrogen gas, the hydrogen sulfide fraction comprises unreacted hydrogen sulfide present in the thermal decomposition unit effluent, and the sulfur fraction comprises sulfur produced from the splitting of the hydrogen sulfide. Finally, the process includes obtaining the hydrogen product from the hydrogen rich fraction, wherein the hydrogen product is comprised of at least 95% by volume hydrogen gas.

An associated system for generating a hydrogen product from a feed gas stream comprising hydrogen sulfide comprises a thermal decomposition unit and a product separation unit. The thermal decomposition unit comprises a reactor vessel having a gas inlet and a gas outlet and a microwave generation unit positioned and configured to deliver microwave energy to a porous susceptor. The reactor vessel has the porous susceptor disposed and retained within an interior volume of the reactor vessel. The gas inlet of the reactor vessel is in fluid communication with the feed gas stream such that the feed gas stream is passed through the porous susceptor and exhausted through the gas outlet as a thermal decomposition unit effluent. Further, the product separation unit is in fluid communication with the gas outlet of the reactor vessel and configured to separate the thermal decomposition unit effluent into a sulfur fraction, a hydrogen rich fraction, and a hydrogen sulfide fraction. The hydrogen rich fraction comprises at least 90% by volume hydrogen gas, the hydrogen sulfide fraction comprises unreacted hydrogen sulfide present in the thermal decomposition unit effluent, and the sulfur fraction comprises sulfur produced from the splitting of the hydrogen sulfide.

Having generally described the various embodiments of processes and associated systems for generating a hydrogen product from a feed gas stream comprising hydrogen sulfide, embodiments of the same are described in further detail and with reference to the various Figures.

Referring to FIG. 1, a schematic illustration of one or more generalized embodiments of the processes of the present disclosure is presented. A feed gas stream 10 comprising hydrogen sulfide is provided to a thermal decomposition unit 100. The thermal decomposition unit 100 is in fluid communication with the feed gas stream 10 and is operable to generate a thermal decomposition unit effluent 20 from the feed gas stream 10 at a gas outlet 114. A product separation unit 200 is in fluid communication with the gas outlet 114 of the thermal decomposition unit 100 and is operable to separate the thermal decomposition unit effluent 20 into a sulfur fraction 30, a hydrogen rich fraction 40, and a hydrogen sulfide fraction 50. The hydrogen sulfide fraction 50 may then be refluxed back to the thermal decomposition unit 100 via reflux line 400.

Thermal Decomposition

Thermal decomposition, or thermolysis, is a chemical decomposition caused by heat. The decomposition temperature of a substance is the temperature at which the substance chemically decomposes. Thermal decomposition of hydrogen sulfide generates hydrogen gas and sulfur. The overall reaction can be expressed as provided in Formula (1), presented infra.

$$2H_2S \xrightarrow{\Delta} 2H_2 + S_2 \qquad \text{Formula (1)}$$

The reaction in accordance with Formula (1) typically initiates at temperatures of greater than 600° C. However, greater temperatures, such as in excess of 1,000° C., may be required to achieve sufficient decomposition ratio between decomposed hydrogen sulfide into hydrogen gas and sulfur and residual hydrogen sulfide. Specifically, the reaction of Formula (1) is highly endothermic and conversions are very poor at low temperatures with thermodynamic equilibria calculations giving less than 10% conversion at 860° C.

It will be appreciated that thermal decomposition of hydrogen sulfide in the presence of water or oxygen may result in a distinct reaction pathway and products than those of Formula (1). For example, thermal decomposition of hydrogen sulfide in the presence of oxygen may result in generation of water and sulfur dioxide ($SO_2$) instead of the desired reaction products of hydrogen gas and sulfur.

Feed Gas Stream

The feed gas stream 10 provides hydrogen sulfide to the thermal decomposition unit 100 for thermal decomposition into hydrogen gas and sulfur. As such, the feed gas stream 10 may comprise a substantial portion of hydrogen sulfide to minimize contamination, side reactions, and inefficiencies of the process and system 1000 resulting from removal or unproductive processing of components of the feed gas stream 10 other than hydrogen sulfide.

In one or more embodiments, the feed gas stream 10 is preprocessed to increase the percentage of hydrogen sulfide. The preprocessing to increase the percentage of hydrogen sulfide may occur within the separate refinery operation providing the feed gas stream 10 as a waste stream or may be provided as part of the presently disclosed process and system 1000.

Figure 2:
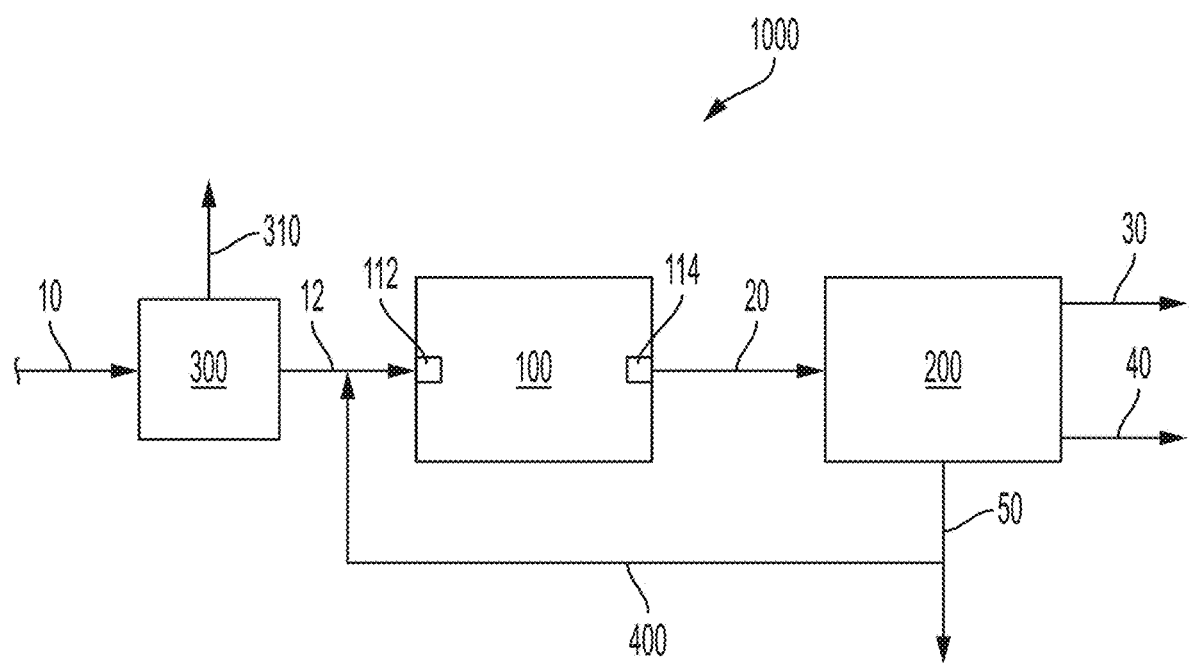
FIG. 2 is a schematic illustration of a system for generating a hydrogen product from a feed gas stream comprising hydrogen sulfide in accordance with one or more embodiments of the present disclosure.

With reference to FIG. 2, such preprocessing is illustrated as a hydrogen sulfide purification unit 300 fed by the feed gas stream 10. The hydrogen sulfide purification unit 300 removes at least a portion of the components of the feed gas stream 10 that are not hydrogen sulfide to provide a purified hydrogen sulfide stream 12 with an increased hydrogen sulfide percentage and a waste gas stream 310 with the removed components from the hydrogen sulfide purification unit 300. Specifically, the feed gas stream 10 is separated to produce the purified hydrogen sulfide stream 12 and the waste gas stream 310 where the waste gas stream 310 may comprise a remainder of the feed gas stream 10 after removal of the purified hydrogen sulfide stream 12. It will be appreciated that the waste gas stream 310 may be provided as a plurality of streams based on the type and style of the hydrogen sulfide purification unit 300 and the mode of operation of the same. Separation or purification of the feed gas stream 10 to generate the purified hydrogen sulfide stream 12 may be completed using any process or unit operation known to those skilled in the art.

It will be appreciated that in embodiments where the purified hydrogen sulfide stream 12 is generated, the purified hydrogen sulfide stream 12 is provided to the thermal decomposition unit 100 in lieu of the feed gas stream 10. Further, it will be appreciated that the feed gas stream 10 may be initially provided with a composition and hydrogen sulfide percentage such that processing in the hydrogen sulfide purification unit 300 is not necessary to achieve the desired hydrogen sulfide concentration. In various embodiments, the feed to the thermal decomposition unit 100, in the form of the feed gas stream 10 or purified hydrogen sulfide stream 12, comprises at least 95 volume percent (vol. %) hydrogen sulfide, at least 98 vol. % hydrogen sulfide, at least 99 vol. % hydrogen sulfide, or at least 99.5 vol. % hydrogen sulfide.

Thermal Decomposition Unit

Figure 3:
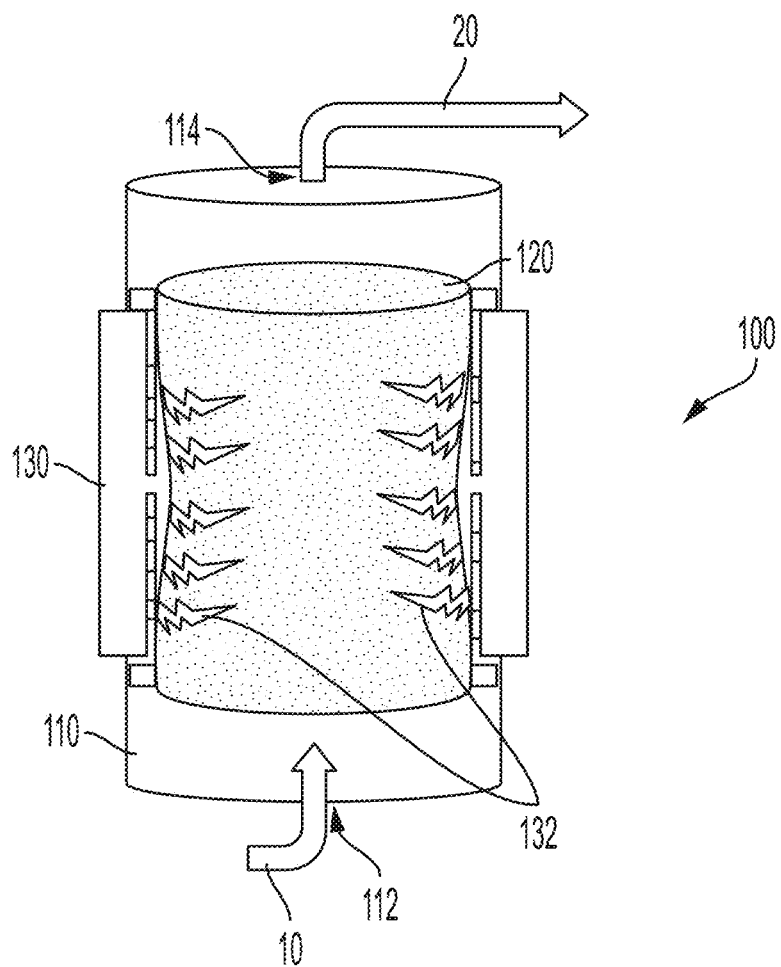
FIG. 3 is an illustration of a thermal decomposition unit in accordance with one or more embodiments of the present disclosure.

With reference to FIG. 3, the thermal decomposition unit 100 includes a reactor vessel 110, a porous susceptor 120, and a microwave generation unit 130. The porous susceptor 120 is disposed and retained within the reactor vessel 110 such that the microwave generation unit 130 delivers microwave energy to the porous susceptor 120 increasing the temperature of the porous susceptor 120.

The reactor vessel 110 of the thermal decomposition unit 100 comprises an open interior volume sized and configured to house and retain the porous susceptor 120. Further, the reactor vessel 110 includes at least one gas inlet 112 and at least one gas outlet 114. The gas inlet 112 is a portal in the reactor vessel 110 to which the feed gas stream 10 may be connected to provide hydrogen sulfide to the reactor vessel 110. It will be appreciated that the purified hydrogen sulfide stream 12, if present, is connected to the gas inlet 112 in lieu of the feed gas stream 10. Similarly, the gas outlet 114 is a portal in the reactor vessel 110 from which the thermal decomposition unit effluent 20 may be exhausted and collected for routing to the product separation unit 200.

The microwave generation unit 130 is positioned and configured to deliver microwave energy 132 to the porous susceptor 120. In one or more embodiments and as illustrated in FIG. 3, at least a portion of the microwave generation unit 130 is positioned within the reaction vessel 110 such that the microwave energy 132 generated by the microwave generation unit 130 may be directly transferred to the porous susceptor without requiring passage through the reaction vessel 110.

The microwave generation unit 132 provides microwave energy to the porous susceptor 120 to heat the same. The power of the microwave generation unit 130 effects the rate of heating and ultimate temperature of the porous susceptor 120. In various embodiments, the microwave generation unit 130 operates at greater than 1,500 Watts (W), greater than 1,800 W, greater than 2,000 W, greater than 2,500, between 1,500 and 5,000 W, between 1,500 and 3,000 W, or between, 1,500 and 2.500 W.

The microwave generation unit 130 may generate electromagnetic radiation in the form of microwave radiation 132 in that range of 1 to 10 gigaHertz (GHz). In various embodiments, the generated electromagnetic radiation may be in the range of 1 GHz to 8 GHz, 1 GHz to 5 GHz, 2 GHz to 3 GHz, or approximately 2.5 GHz. The frequency at which the microwave generation unit 130 operated may be selected based on the desired power generation. It will be appreciated that a greater frequency will yield more power.

The porous susceptor 120 is positioned in the reaction vessel 110 such that hydrogen sulfide in the feed gas stream 10 provided to the gas inlet 112 is passed through the reaction vessel 110 in intimate contact with the porous susceptor 120. The porous susceptor 120 comprises a material which absorbs microwave energy 132 generated by the microwave generation unit 130 and converts the microwave energy 132 into thermal energy. The conversion from microwave energy 132 to thermal energy raises the temperature of the porous susceptor 120 to provide the required heat to drive the thermal decomposition of the hydrogen sulfide provided to the thermal decomposition unit 100 in accordance with Formula (1).

In one or more embodiments, the microwave energy 132 from the microwave generation unit 130 into the porous susceptor 120 raises the temperature of the porous susceptor 120 to greater than 1,000° C. In various further embodiments, the microwave energy 132 from the microwave generation unit 130 directed into the porous susceptor 120 raises the temperature of the porous susceptor 120 to greater than 1,050° C. greater than 1,100° C., greater than 1,150° C. 1,000 to 1,200° C., 1,000 to 1,100° C., or 1,100 to 1,200° C. The temperature of the porous susceptor 120 may be restrained once the 1,000° C. threshold is reached to avoid damage to the porous susceptor 120. Further, excessive temperature increase may not provide an increased decomposition benefit commensurate with the increased energy usage required to sustain a further elevated temperature.

As the porous susceptor 120 absorbs the microwave energy 132 generated by the microwave generation unit 130 to generate heat, the porous susceptor 120 must comprise at least one material which absorbs microwave energy 132. In various embodiments, the porous susceptor 120 comprises one or more of activated carbon, aluminum oxide, silicon carbide, and silicon nitride, or other know microwave absorbing materials. It is noted, and will be readily appreciated, that the porous susceptor 120 must be formed from a material capable of sustaining the elevated temperature upon absorption of the microwave energy 132.

The porous susceptor 120 may be formed into any desired geometry to fill the void space within the reaction vessel 110. Providing a tight fit within the reaction vessel 110 forces the gas feed stream 10 or the purified hydrogen sulfide stream 12 to pass through the porous susceptor 120 opposed to passing around the same. Further, forming the porous susceptor 120 into a shape matching an interior profile of the reaction vessel 110 maximizes the amount of the porous susceptor 120 provided allowing for extended operation without the need for regeneration or replacement of the porous susceptor 120 at end of operational life.

The porous susceptor 120 includes interconnected pores to allow passage of the hydrogen sulfide provided to the thermal decomposition unit 100 and the generated hydrogen gas and sulfur forming the thermal decomposition unit effluent 20 to flow through the porous susceptor 120. The interconnected pores for passage of the hydrogen sulfide through the porous susceptor 120 while ensuring intimate Con tact between the hydrogen sulfide and the porous susceptor 120. Specifically, as the hydrogen sulfide is decomposed to hydrogen and sulfur through heating, reducing the distance between each molecule of hydrogen sulfide and the heated porous susceptor 120 with a series of interconnected pored through which the hydrogen sulfide is flowed minimizes the need for thermal conduction or convection through the bulk hydrogen sulfide.

In various embodiments the porous susceptor 120 comprises a porosity of 50 to 75 percent by volume, 60 to 75 percent by volume, or 50 to 65 percent by volume. It will be appreciated that increasing the porosity of the porous susceptor 120 reduces the flow resistance of the gas feed stream 10 or the purified hydrogen sulfide stream 12 through the porous susceptor 120. However, increasing the porosity of the porous susceptor 120 also results in less intimate contact between the hydrogen sulfide and the heated material of the porous susceptor 120 with an increased reliance on thermal conduction or convection through the bulk hydrogen sulfide which reduces the efficiency of the thermal decomposition unit 100. It will be appreciated that a decrease in the porosity generates the opposite effect as those described for an increase in porosity with increased flow resistance but more intimate contact between the hydrogen sulfide and the material of the porous susceptor 120.

In one or more embodiments, the porous susceptor 120 comprises pores with an average pore size of 1 micron to 1 millimeter. It will be appreciated that that increasing the pore size of the porous susceptor 120 reduces the flow resistance of the gas feed stream 10 or the purified hydrogen sulfide stream 12 through the porous susceptor 120 in a manner similar to increasing the porosity. However, as was noted with an increase in porosity, increasing the pore size of the porous susceptor 120 also results in less intimate contact between the hydrogen sulfide and the heated material of the porous susceptor 120 with an increased reliance on thermal conduction or convection through the bulk hydrogen sulfide which reduces the efficiency of the thermal decomposition unit 100. It will be appreciated that a decrease in the pore size generates the opposite effect as those described for an increase in pore size with increased flow resistance but more intimate contact between the hydrogen sulfide and the material of the porous susceptor 120.

It is explicitly noted that the porous susceptor 120 is retained in the reactor vessel 110. Indication that the porous susceptor 120 is "retained", for the purposes of the present disclosure, means that the porous susceptor 120 is not removed from the reactor vessel 110 during operation of the process for generating a hydrogen product for the porous susceptor 120 to be regenerated or replaced. Instead the porous susceptor 120 remains in the reactor vessel 110 for the duration of the process.

The porous susceptor 120, in one or more embodiments, may comprise one or more catalysts imbedded within the porous susceptor 120. The catalyst may be selected to increase the reaction rate of the thermal decomposition of the hydrogen sulfide, to reduce the temperature at which thermal decomposition of the hydrogen sulfide is initiated, or both. It will be appreciated that increasing the reaction rate of the thermal decomposition of the hydrogen sulfide will result in an increased percentage of the hydrogen sulfide passing through the thermal decomposition unit 100 being broken into hydrogen gas and sulfur, thus yielding increased generation of the hydrogen product without repeated processing. Similarly, reduction of the temperature at which thermal decomposition of the hydrogen sulfide is initiated yields an increase in energy efficiency of the process. Specifically, reducing of the temperature at which thermal decomposition of the hydrogen sulfide is initiated allows for a decreased temperature to which the porous susceptor 120 is raised while maintaining hydrogen sulfide decomposition, an increased rate of hydrogen sulfide decomposition as a result of the shift in the reaction rate curve at each temperature, or both.

In various embodiments, the catalyst imbedded within the porous susceptor 120 comprises one or more of $TiO_2$, $MoS_2$, $CdS_2$, and $ZnO$.

The catalyst imbedded within the porous susceptor 120 may, in one or more embodiments, forms up to 1.0 wt. % of the porous susceptor 120. In various further embodiments, the porous susceptor 120 comprises the one or more catalysts at a concentration of up to 0.9 wt. %, up to 0.8 wt. %, up to 0.7 wt. %, up to 0.6 wt. %, 0.2 to 1.0 wt. %, 0.4 to 1.0 wt. %, or 0.6 to 1.0 wt. % of the porous susceptor 120. It will be appreciated that increasing the loading of the catalyst in the porous susceptor 120 results in a commensurate increase in the reaction rate of the thermal decomposition of the hydrogen sulfide, a commensurate reduction in the temperature at which thermal decomposition of the hydrogen sulfide is initiated, or both until the maximum catalytic effect is reached.

The catalyst may be imbedded within the porous susceptor 120 during formation of the porous susceptor 120. In one or more embodiments, the catalyst is provided as a powder which is mixed with the material forming the porous susceptor 120 with the mixture formed into a solid unit concurrently. Such integration method for the catalyst disposes the catalyst throughout the volume of the porous susceptor 120.

In one or more embodiments, the thermal decomposition unit 100 is flushed with an inert gas prior to feeding the hydrogen sulfide present in the feed gas stream 10 into the thermal decomposition unit 100. Flushing the thermal decomposition unit 100 with the inert gas ensures that thermally decomposing hydrogen sulfide in the thermal decomposition unit 100 occurs in the absence of oxygen or water. As previously indicated, the presence of oxygen or water may result in undesirable alternate reaction of the hydrogen sulfide and not the desired thermal decomposition in accordance with Formula (1). In various embodiments, the inert gas may be nitrogen or one of the noble gas such as argon.

Product Separation Unit

With reference to FIGS. 1, 2, 4, and 5, the product separation unit 200 is provided in fluid communication with the gas outlet 114 of the reactor vessel 110 and is configured to separate the thermal decomposition unit effluent 20 into the sulfur fraction 30, the hydrogen rich fraction 40, and the hydrogen sulfide fraction 50. The hydrogen sulfide fraction 50 comprises unreacted hydrogen sulfide in the thermal decomposition unit effluent, the sulfur fraction 30 comprises sulfur produced from the splitting of the hydrogen sulfide, and the hydrogen rich fraction 40 comprises concentrated hydrogen gas for collection or further purification as the hydrogen product.

Figure 4:
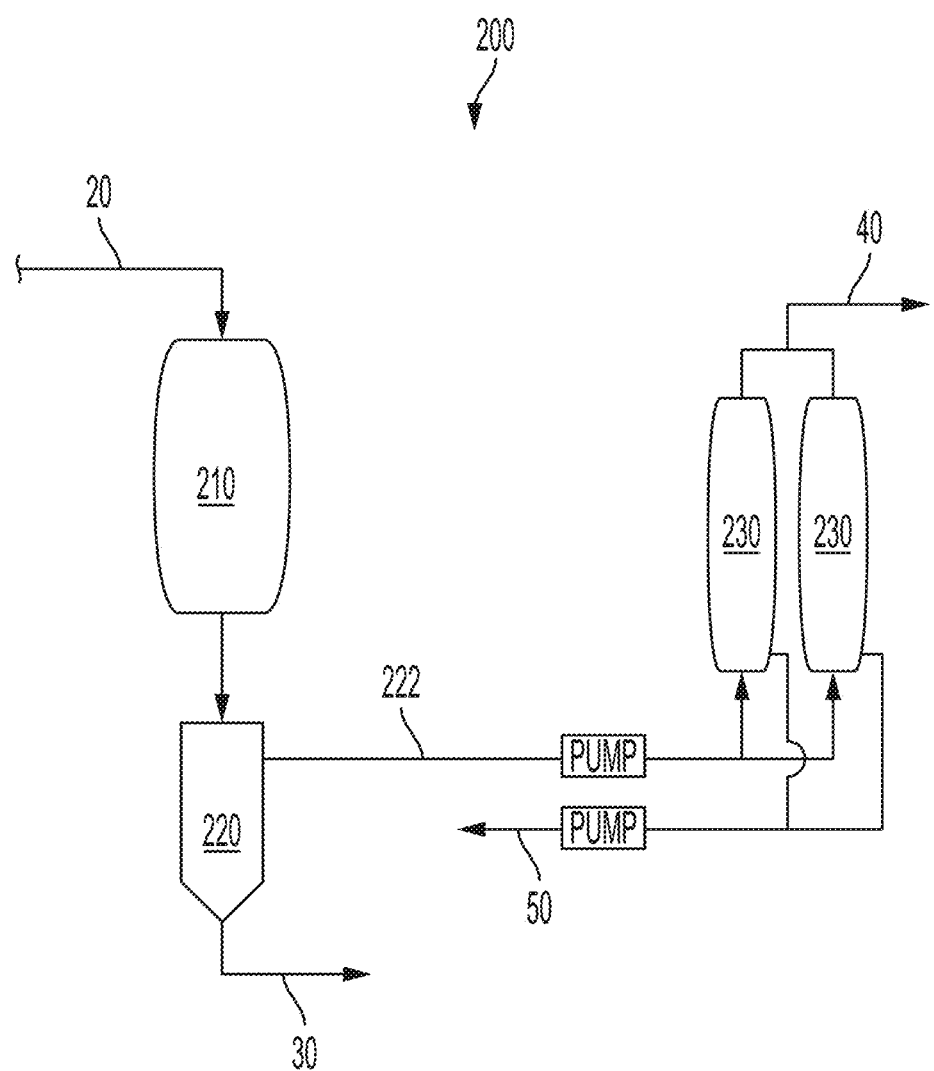
FIG. 4 is a schematic illustration of a product separation unit in accordance with one or more embodiments of the present disclosure.

With reference to FIGS. 4, in one or more embodiments, the product separation unit 200 comprises a heat exchanger 210, a two-phase separator 220, and a pressure swing adsorption unit 230. In accordance with such arrangement, the sulfur fraction 30 is separated from the thermal decomposition unit effluent 20 with the two-phase separator 220 and the heat exchanger 210. Specifically, the thermal decomposition unit effluent 20 is cooled in the heat exchanger 210 to condense the sulfur in the thermal decomposition unit effluent 20 to a liquid phase. The sulfur in a liquid phase and a gaseous phase comprising the hydrogen rich fraction and the hydrogen sulfide fraction may then be separated in the two-phase separator 220 to generate the sulfur fraction 30 and a gaseous effluent 222. The gaseous effluent 222 may then be passed to the pressure swing adsorption unit 230 to separate the gaseous effluent 222 into the hydrogen rich fraction 40, and the hydrogen sulfide fraction 50.

Figure 5:
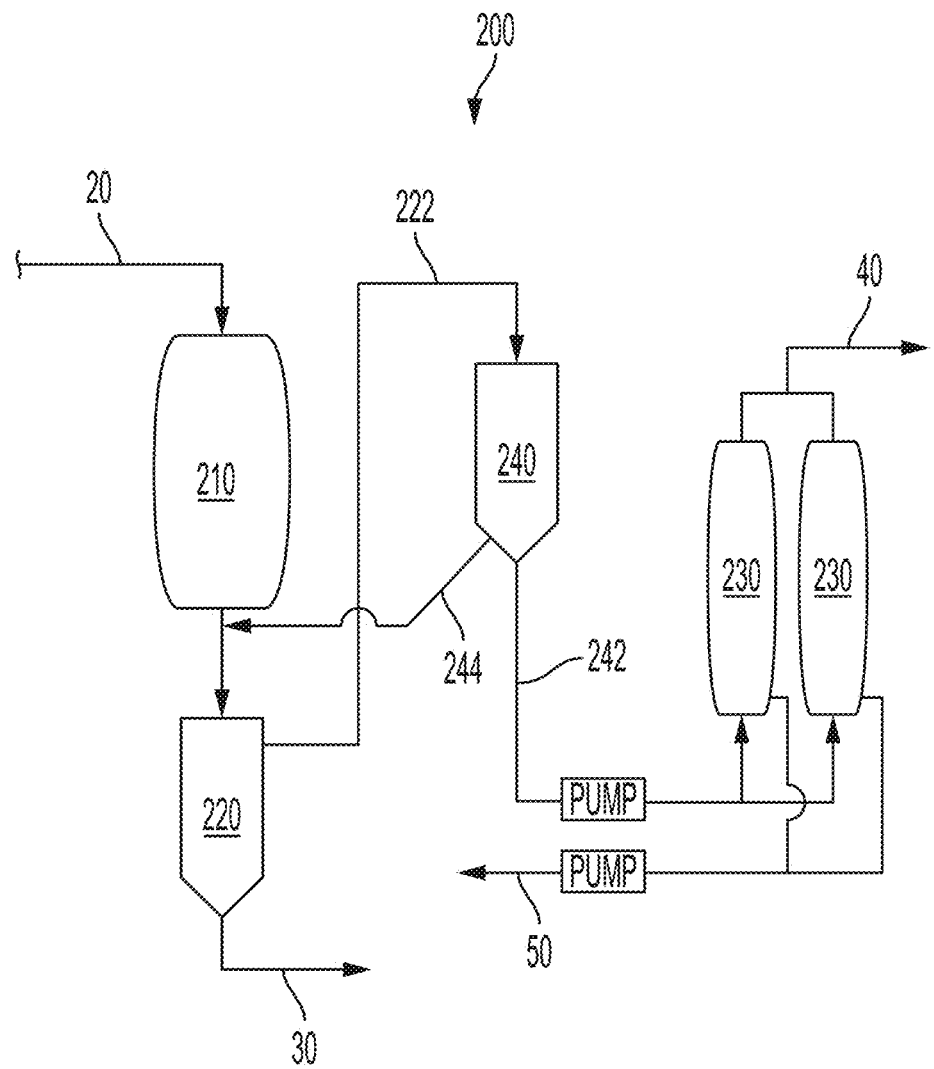
FIG. 5 is a schematic illustration of a product separation unit in accordance with one or more embodiments of the present disclosure.

With reference to FIGS. 5, in one or more embodiments, the product separation unit 200 may further comprise an electrofiltration unit 240 in addition to the heat exchanger 210, the two-phase separator 220, and the pressure swing adsorption unit 230. In accordance with such arrangement, the sulfur fraction 30 is separated from the thermal decomposition unit effluent 20 with the two-phase separator 220 and the heat exchanger 210. Specifically, the thermal decomposition unit effluent 20 is cooled in the heat exchanger 210 to condense the sulfur in the thermal decomposition unit effluent 20 to a liquid phase. The sulfur in a liquid phase and a gaseous phase comprising the hydrogen rich fraction and the hydrogen sulfide fraction may then be separated in the two-phase separator 220 to generate the sulfur fraction 30 and a gaseous effluent 222. The gaseous effluent 222 is then passed to the electrofiltration unit 240 instead of directly to pressure swing adsorption unit 230 to remove residual sulfur in the gaseous effluent 222 to generate a purified gaseous effluent 242. The residual sulfur removed from the gaseous effluent 222 is then combined with the effluent from the heat exchanger 210 prior to entering the two-phase separator 220. The purified gaseous effluent 242 is then directed to the pressure swing adsorption unit 230 to separate the purified gaseous effluent 242 into the hydrogen rich fraction 40, and the hydrogen sulfide fraction 50.

The heat exchanger 210 may be of any style known to those skilled in the art provided it is of sufficient capacity and size to process and cool the flow of the thermal decomposition unit effluent 20. As heat exchangers and their general operation are familiar to those skilled in the art express details of the heat exchanger 210 are omitted for conciseness.

The two-phase separator 220 may be of any style known to those skilled in the art provided it is of sufficient capacity and size to process and separate the flow of the chilled thermal decomposition unit effluent 20 entering the two-phase separator 220. As two-phase separators and their general operation are familiar to those skilled in the art express details of the two-phase separator 220 are omitted for conciseness.

The pressure swing adsorption unit 230 may be of any style known to those skilled in the art provided it is of sufficient capacity and size to process and separate the flow of gaseous effluent 222, or purified gaseous effluent 242 if the electrofiltration unit 240 is present. It will be understood that pressure swing adsorption is a technique used to separate selected gaseous species from a mixture of gases according to the species' molecular characteristics and affinity for an adsorbent material. The pressure swing adsorption unit 230 operates by adsorbing the hydrogen sulfide with an adsorbent material at high pressure and then reducing the pressure within the pressure swing adsorption unit 230 to desorb the hydrogen sulfide for collection as the hydrogen sulfide fraction 50.

In various embodiments, the adsorbent material of the pressure swing adsorption unit 230 may be selected from various adsorbent materials known to those skilled in the art for removing one or more specific chemical species. In one or more embodiments, the adsorbent material of the pressure swing adsorption unit 230 is a $H_2S$ scavenger with the intended purpose of removing unreacted hydrogen sulfide.

In one or more embodiments, and as illustrated in FIGS. 4 and 5, the pressure swing adsorption unit 230 may provide two or more parallel reactor units to allow for alternating operating. The parallel reactor units provided as part of the pressure swing adsorption unit 230 allows for continuous flow of the gaseous effluent 222 as one or more reactor units may process the gaseous effluent 222 and adsorb hydrogen sulfide while one or more further reactor units undergo desorption of collected hydrogen sulfide. Such alternating processing allows for a continuous process flow.

The hydrogen rich fraction 40 comprises the hydrogen gas sulfur produced from the splitting of the hydrogen sulfide. In one or more embodiments, the hydrogen rich fraction 40 comprises at least 90% by volume hydrogen gas. In various further embodiments, the hydrogen rich fraction 40 comprises at least 92% by volume hydrogen gas, at least 94% by volume hydrogen gas, at least 95% by volume hydrogen gas, at least 98% by volume hydrogen gas, or at least 99% by volume hydrogen gas. Et will be appreciated that improved separation in the pressure swing adsorption unit 230 may generate a more pure hydrogen stream in the hydrogen rich fraction 40. The remainder of the hydrogen rich fraction 40 beyond the hydrogen gas may include residual sulfur and residual hydrogen sulfide.

The hydrogen product is subsequently obtained from the hydrogen rich fraction 40. In one or more embodiments, the hydrogen product comprises at least 95% by volume hydrogen gas. In various further embodiments, the hydrogen product comprises at least 96% by volume hydrogen gas, at least 97% by volume hydrogen gas, at least 98% by volume hydrogen gas, at least 99% by volume hydrogen gas, or at least 99.5% by volume hydrogen gas. It is noted that in one or more embodiments, the hydrogen rich fraction 40 may be of sufficient purity so as to be synonymous with the hydrogen product. In further embodiments, the hydrogen rich fraction 40 may be provided to further unit operations (not shown) to further purify the hydrogen rich fraction 40 to generate the hydrogen product. As hydrogen purification operations are familiar to those skilled in the art express details of the further unit operations to further purify the hydrogen rich fraction 40 to generate the hydrogen product are omitted for conciseness.

The hydrogen sulfide fraction 50 comprises unreacted hydrogen sulfide separated from the thermal decomposition unit effluent 20. In one or more embodiments, the hydrogen sulfide fraction 50 separated from the thermal decomposition unit effluent 20 is combined with the feed gas stream 10 for further processing in the thermal decomposition unit 100. Similarly, in one or more embodiments where the feed gas stream 10 is preprocessed to generate the purified hydrogen sulfide fraction 12, the hydrogen sulfide fraction 50 separated from the thermal decomposition unit effluent 20 is combined with the purified hydrogen sulfide fraction 12 for further processing in the thermal decomposition unit 100. It will be appreciated that refluxing the hydrogen sulfide fraction 50 back to the thermal decomposition unit 100 via reflux line 400 increases the overall decomposition of the hydrogen sulfide in the feed gas stream 100.

Based on the foregoing, it should now be understood that various aspects of processes and systems fir generating a hydrogen product from a feed gas comprising hydrogen sulfide are disclosed herein.

According to a first aspect of the present disclosure, a process for generating a hydrogen product from a feed gas stream comprising hydrogen sulfide comprises (a) thermally decomposing hydrogen sulfide present in the feed gas stream into hydrogen gas and elemental sulfur in a thermal decomposition unit, the thermal decomposition unit comprising a reactor vessel with a porous susceptor disposed and retained therein and a microwave generation unit positioned and configured to deliver microwave energy to the porous susceptor, wherein thermally decomposing hydrogen sulfide in the thermal decomposition unit comprises: (i) directing microwave energy from the microwave generation unit into the porous susceptor to raise the temperature of the porous susceptor to greater than 1000° C. (ii) feeding the hydrogen sulfide present in the feed gas stream into the thermal decomposition unit via a gas inlet, (iii) passing the hydrogen sulfide through the porous susceptor to thermally decompose the hydrogen sulfide and generate a thermal decomposition unit effluent comprising hydrogen gas and elemental sulfur, and (iv) exhausting the thermal decomposition unit effluent from the thermal decomposition unit via a gas outlet; (b) separating the thermal decomposition unit effluent into a sulfur fraction, a hydrogen rich fraction, and a hydrogen sulfide fraction, wherein the hydrogen rich fraction is comprised of at least 90% by volume hydrogen gas, the hydrogen sulfide fraction comprises unreacted hydrogen sulfide in the thermal decomposition unit effluent, and the sulfur fraction comprises sulfur produced from the splitting of the hydrogen sulfide; and (c) obtaining the hydrogen product from the hydrogen rich fraction, wherein the hydrogen product is comprised of at least 95% by volume hydrogen gas.

A second aspect includes the process of the first aspect, in which the hydrogen product from the hydrogen rich fraction is comprised of at least 98% by volume hydrogen gas.

A third aspect includes the process of the first or second aspects, in which the thermal decomposition unit is flushed with an inert gas such that thermally decomposing hydrogen sulfide in the thermal decomposition unit occurs in the absence of oxygen or water.

A fourth aspect includes the process of the third aspect, in which the inert gas is nitrogen.

A fifth aspect includes the process of any of the first through fourth aspects, in which the feed gas stream is separated to produce a purified hydrogen sulfide stream and a waste gas stream, the purified hydrogen sulfide fraction comprising at least 95 percent by volume hydrogen sulfide and the waste gas stream comprising a remainder of the feed gas stream after removal of the purified hydrogen sulfide fraction.

A sixth aspect includes the process of any of the first through fifth aspects, in which the hydrogen sulfide fraction separated from the thermal decomposition unit effluent is combined with the feed gas stream for further processing in the thermal decomposition unit.

A seventh aspect includes the process of the fifth aspect, in which the hydrogen sulfide fraction separated from the thermal decomposition unit effluent is combined with the purified hydrogen sulfide fraction for further processing in the thermal decomposition unit.

An eighth includes the process of any of the first through seventh aspects, in which the porous susceptor comprises a material which absorbs microwave energy.

A ninth aspect includes the process of any of the first through eighth aspects, in which the porous susceptor comprises one or more of activated carbon, aluminum oxide, silicon carbide, and silicon nitride.

A tenth aspect includes the process of any of the first through ninth aspects, in which the porous susceptor comprises a porosity of 50 to 75 percent by volume.

An eleventh aspect includes the process of any of the first through tenth aspects, in which the porous susceptor comprises pores with an average pore size of 1 micron to 1 millimeter.

A twelfth aspect includes the process of any of the first through eleventh aspects, in which the porous susceptor comprises one Or more catalysts imbedded within the porous susceptor, the catalyst selected to increase the reaction rate of the thermal decomposition of the hydrogen sulfide, to reduce the temperature at which thermal decomposition of the hydrogen sulfide is initiated, or both.

A thirteenth aspect includes the process of the twelfth aspect, in which the catalyst comprises one or more of $TiO_2$, $MoS_2$, $CdS_2$, and ZnO.

A fourteenth aspect includes the process of the twelfth or thirteenth aspect, in which the the porous susceptor comprises the one or more catalysts at a concentration of up to 1 wt % of the porous susceptor.

A fifteenth aspect includes the process of any of the first through fourteenth aspects, in which the microwave generation unit operates at 1,500 Watts of greater.

A sixteenth aspect includes the process of any of the first through fifteenth aspects, in which the microwave generation unit provides electromagnetic radiation in the range of 1 to 10 GHz.

A seventeenth aspect includes the process of any of the first through sixteenth aspects, in which the sulfur fraction is separated from the thermal decomposition unit effluent with two-phase separation in which the sulfur fraction is converted to a liquid phase by cooling the thermal decomposition unit effluent to allow separation of the sulfur fraction in the liquid phase from a gaseous phase comprising the hydrogen rich fraction and the hydrogen sulfide fraction.

An eighteenth aspect includes the process of any of the first through seventeenth aspects, in which a gaseous phase comprising the hydrogen gas and the unreacted hydrogen sulfide after removal of the sulfur fraction is separated into the hydrogen rich fraction and the hydrogen sulfide fraction through pressure swing adsorption.

According to a nineteenth aspect of the present disclosure, a system for generating a hydrogen product from a feed gas stream comprising hydrogen sulfide comprises (a) a thermal decomposition unit, the thermal decomposition unit comprising: a reactor vessel having a gas inlet and a gas outlet, the reactor vessel having a porous susceptor disposed and retained therein, and a microwave generation unit positioned and configured to deliver microwave energy to the porous susceptor, wherein the gas inlet of the reactor vessel is in fluid communication with the feed gas stream such that the feed gas stream is passed through the porous susceptor and exhausted through the gas outlet as a thermal decomposition unit effluent; and (b) a product separation unit in fluid communication with the gas outlet of the reactor vessel configured to separate the thermal decomposition unit effluent into a sulfur fraction, a hydrogen rich fraction, and a hydrogen sulfide fraction, wherein the hydrogen rich fraction comprises at least 90% by volume hydrogen gas, the hydrogen sulfide fraction comprises unreacted hydrogen sulfide in the thermal decomposition unit effluent, and the sulfur fraction comprises sulfur produced from the splitting of the hydrogen sulfide.

A twentieth aspect includes the system of the nineteenth aspect, in which the system further comprises a reflux line in fluid communication with the hydrogen sulfide fraction exiting the product separation unit and the gas inlet of the reactor vessel to transfer the hydrogen sulfide fraction separated from the thermal decomposition unit effluent to the thermal decomposition unit for further processing in the thermal decomposition unit.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned. For brevity, the same is not explicitly indicated subsequent to each disclosed range and the present general indication is provided.

As used in this disclosure and in the appended claims, the words "comprise," "has," and "include" and all grammatical variations thereof are each intended to have an open, non-limiting meaning that does not exclude additional elements or steps.

What is claimed is:

1. A process for generating a hydrogen product from a feed gas stream comprising hydrogen sulfide, comprising the following steps:
   (a) thermally decomposing hydrogen sulfide present in the feed gas stream into hydrogen gas and elemental sulfur in a thermal decomposition unit, the thermal decomposition unit comprising a reactor vessel with a porous susceptor disposed and retained therein and a microwave generation unit positioned and configured to deliver microwave energy to the porous susceptor, wherein thermally decomposing hydrogen sulfide in the thermal decomposition unit comprises:
      (i) directing microwave energy from the microwave generation unit into the porous susceptor to raise the temperature of the porous susceptor to greater than 1,000° C.,
      (ii) feeding the hydrogen sulfide present in the feed gas stream into the thermal decomposition unit via a gas inlet,
      (iii) passing the hydrogen sulfide through the porous susceptor to thermally decompose the hydrogen sulfide and generate a thermal decomposition unit effluent comprising hydrogen gas and elemental sulfur, and
      (iv) exhausting the thermal decomposition unit effluent from the thermal decomposition unit via a gas outlet;
   (b) separating the thermal decomposition unit effluent into a sulfur fraction, a hydrogen rich fraction, and a hydrogen sulfide fraction, wherein the hydrogen rich fraction is comprised of at least 90% by volume hydrogen gas, the hydrogen sulfide fraction comprises unreacted hydrogen sulfide in the thermal decomposition unit effluent, and the sulfur fraction comprises sulfur produced from the splitting of the hydrogen sulfide, and wherein a gaseous phase comprising the hydrogen gas and the unreacted hydrogen sulfide after removal of the sulfur fraction is separated into the hydrogen rich fraction and the hydrogen sulfide fraction through pressure swing adsorption; and
   (c) obtaining the hydrogen product from the hydrogen rich fraction, wherein the hydrogen product is comprised of at least 95% by volume hydrogen gas.

2. The process of claim 1, wherein the hydrogen product from the hydrogen rich fraction is comprised of at least 98% by volume hydrogen gas.

3. The process of claim 1, wherein the thermal decomposition unit is flushed with an inert gas such that thermally decomposing hydrogen sulfide in the thermal decomposition unit occurs in the absence of oxygen or water.

4. The process of claim 3, wherein the inert gas is nitrogen.

5. The process of claim 1, wherein the feed gas stream is separated to produce a purified hydrogen sulfide stream and a waste gas stream, the purified hydrogen sulfide fraction comprising at least 95 percent by volume hydrogen sulfide and the waste gas stream comprising a remainder of the feed gas stream after removal of the purified hydrogen sulfide fraction.

6. The process of claim 1, wherein the hydrogen sulfide fraction separated from the thermal decomposition unit effluent is combined with the feed gas stream for further processing in the thermal decomposition unit.

7. The process of claim 5, wherein the hydrogen sulfide fraction separated from the thermal decomposition unit effluent is combined with the purified hydrogen sulfide fraction for further processing in the thermal decomposition unit.

8. The process of claim 1, wherein the porous susceptor comprises a material which absorbs microwave energy.

9. The process of claim 8, wherein the porous susceptor comprises one or more of activated carbon, aluminum oxide, silicon carbide, and silicon nitride.

10. The process of claim 1, wherein the porous susceptor comprises a porosity of 50 to 75 percent by volume.

11. The process of claim 1, wherein the porous susceptor comprises pores with an average pore size of 1 micron to 1 millimeter.

12. The process of claim 1, wherein the porous susceptor comprises one or more catalysts imbedded within the porous susceptor, the catalyst selected to increase the reaction rate of the thermal decomposition of the hydrogen sulfide, to reduce the temperature at which thermal decomposition of the hydrogen sulfide is initiated, or both.

13. The process of claim 12, wherein the catalyst comprises one or more of $TiO_2$, $MoS_2$, $CdS_2$, and $ZnO$.

14. The process of claim 12, wherein the porous susceptor comprises the one or more catalysts at a concentration of up to 1 wt % of the porous susceptor.

15. The process of claim 1, wherein the microwave generation unit operates at 1,500 Watts of greater.

16. The process of claim 1, wherein the microwave generation unit provides electromagnetic radiation in the range of 1 to 10 GHz.

17. The process of claim 1, wherein the sulfur fraction is separated from the thermal decomposition unit effluent with two-phase separation in which the sulfur fraction is converted to a liquid phase by cooling the thermal decomposition unit effluent to allow separation of the sulfur fraction in the liquid phase from a gaseous phase comprising the hydrogen rich fraction and the hydrogen sulfide fraction.

18. A process for generating a hydrogen product from a feed gas stream comprising hydrogen sulfide, comprising the following steps:
- (a) thermally decomposing hydrogen sulfide present in the feed gas stream into hydrogen gas and elemental sulfur in a thermal decomposition unit, the thermal decomposition unit comprising a reactor vessel with a porous susceptor disposed and retained therein and a microwave generation unit positioned and configured to deliver microwave energy to the porous susceptor, wherein thermally decomposing hydrogen sulfide in the thermal decomposition unit comprises:
  - (i) directing microwave energy from the microwave generation unit into the porous susceptor to raise the temperature of the porous susceptor to greater than 1,000° C.,
  - (ii) feeding the hydrogen sulfide present in the feed gas stream into the thermal decomposition unit via a gas inlet,
  - (iii) passing the hydrogen sulfide through the porous susceptor to thermally decompose the hydrogen sulfide and generate a thermal decomposition unit effluent comprising hydrogen gas and elemental sulfur, and
  - (iv) exhausting the thermal decomposition unit effluent from the thermal decomposition unit via a gas outlet;
- (b) separating the thermal decomposition unit effluent into a sulfur fraction, a hydrogen rich fraction, and a hydrogen sulfide fraction, wherein the hydrogen rich fraction is comprised of at least 90% by volume hydrogen gas, the hydrogen sulfide fraction comprises unreacted hydrogen sulfide in the thermal decomposition unit effluent, and the sulfur fraction comprises sulfur produced from the splitting of the hydrogen sulfide, and wherein the sulfur fraction is separated from the thermal decomposition unit effluent with two-phase separation in which the sulfur fraction is converted to a liquid phase by cooling the thermal decomposition unit effluent to allow separation of the sulfur fraction in the liquid phase from a gaseous phase comprising the hydrogen rich fraction and the hydrogen sulfide fraction; and
- (c) obtaining the hydrogen product from the hydrogen rich fraction, wherein the hydrogen product is comprised of at least 95% by volume hydrogen gas.

19. The process of claim 1, wherein the feed gas stream is separated to produce a purified hydrogen sulfide stream and a waste gas stream, the purified hydrogen sulfide fraction comprising at least 95 percent by volume hydrogen sulfide and the waste gas stream comprising a remainder of the feed gas stream after removal of the purified hydrogen sulfide fraction.

20. The process of claim 1, wherein the porous susceptor comprises a material which absorbs microwave energy.

* * * * *